(No Model.)

E. M. DART.
SELF LUBRICATING STOP COCK.

No. 464,429. Patented Dec. 1, 1891.

Witnesses
Chas. F. Schmelz.
F. A. Fairbrother, Jr.

Inventor
Edward M. Dart

By his Attorney
S. Scholfield

UNITED STATES PATENT OFFICE.

EDWARD M. DART, OF PROVIDENCE, RHODE ISLAND.

SELF-LUBRICATING STOP-COCK.

SPECIFICATION forming part of Letters Patent No. 464,429, dated December 1, 1891.

Application filed March 17, 1890. Serial No. 344,189. (No model.)

*To all whom it may concern:*

Be it known that I, EDWARD M. DART, a citizen of the United States, residing at Providence, in the State of Rhode Island, have invented a new and useful Improvement in Self-Lubricating Stop-Cocks, of which the following is a specification.

It is well known by gas-fitters and others that a few months after a gas-meter has been set the gas-service cock for the same will become dry, so as to be turned with great difficulty and liability to injury, and heretofore projecting chambers for holding the lubricating material have been employed, whereby a supply of said material could be provided; but such construction is impracticable on account of the various positions in which a gas-service cock must be placed, sometimes upon its side and sometimes upside down and often in inaccessible positions, in which a socket-wrench must be employed to turn the plug, and in such situations the lubricating material will be drawn away from contact with the surfaces to be lubricated; and it is the object of my invention to provide a gas-service cock with a permanent supply of lubricating material, which will supply the cock for years without liability of becoming dry, and be so arranged in the plug that there shall be no projecting parts to interfere with the placing of the cock in any position, and under any condition in which such cocks have been heretofore used, and so that the lubricating material will be properly held in contact with the wall of the shell which surrounds the plug in whatever position the service-cock is placed; and my invention consists in a gas-service cock provided with a plug having a head adapted for a socket-wrench and a reservoir-chamber located between the said head and the gas-passage through the plug, said chamber being adapted to hold a permanent supply of lubricating material, the wall of the shell of the cock forming a portion of the wall of the reservoir-chamber, and provided with means for tightly closing the reservoir-chamber at the head of the plug without interfering with the application of a socket-wrench thereto; and my invention also consists in a gas-service cock constructed as above mentioned and containing a permanent sealed supply of lubricating material in the reservoir-chamber of the plug.

Figure 1:
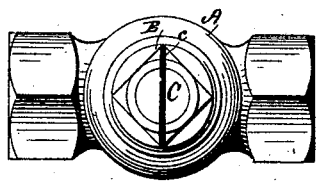
Figure 2:
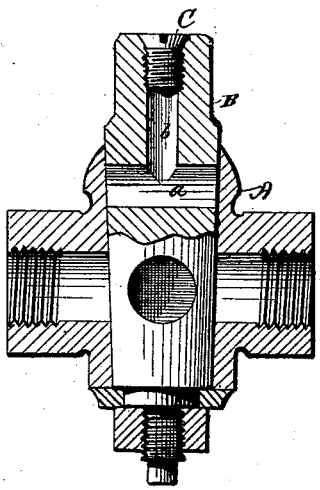

Figure 1 represents an axial section of a gas-service cock provided with my improvement. Fig. 2 represents a top view of the same.

In the accompanying drawings, A represents the shell of a gas-service cock, and B the plug of the same, the said plug being provided diametrically with a gas-passage $e$, as usual, and with the transversely-directed chamber $a$, which extends from side to side of the plug, the outer shell A forming the end wall of the said chamber, which also has an upward extension $b$ leading to the head $d$ of the plug B, and tightly closed by means of the screw-plug C, which bears against a conical seat made in the head of the plug B of the cock.

The plug B of a gas-service cock is usually provided with the slot or groove $c$, which serves to indicate whether the cock is open or closed, and when cutting this slot I also cut the slot in the head of the screw C, so that when the screw C is turned firmly down to its seat to close the chamber $a$ the slot of the screw will coincide in direction with the slot of the plug B, as shown in Fig. 2.

The lubricating material in the chamber $a$ may be composed of a mixture of beeswax and oil in suitable proportions, and the said material will come in contact with the interior wall of the shell A, which forms the end of the chamber $a$, and will spread thence between the shell A and the plug B in both directions by capillary attraction, thus insuring the perfect and continued lubrication of the same without waste of the lubricating material.

I claim as my invention—

1. The herein-described stop-cock, consisting of a shell providing a seat for the plug, a rotative plug fitting closely therein and having the usual transverse passage, said plug being further provided with a lubricant-containing chamber formed in the upper portion thereof, the ends of which chamber are on the sides of the plug and are closed by the wall of the shell, and said plug having also an inlet-opening communicating with the said chamber, through which lubricating material may be placed within the chamber, the whole arranged so that said lubricating material may spread itself by capillary attraction through the joints between the plug and seat, so that the plug may be kept thoroughly lubricated for a long period, substantially as described.

2. The herein-described stop-cock, consisting of a shell providing a seat for the plug, a rotative tapering plug fitting closely therein, said plug having its upper projecting end suitably squared for the application thereto of a wrench and having also the usual transverse passage in line with the passage in the service-pipe, and said plug having also a lubricant-receiving chamber formed in the upper portion thereof, the ends of which chamber are on the sides of the plug and are closed by the wall of the shell, an inlet-opening in the upper end of the plug communicating with the aforesaid chamber and adapted to permit the introduction of the lubricating material into the chamber, and a screw-plug for closing said inlet-openings, the whole arranged so that the lubricating material within the chamber may spread itself by capillary attraction through the joints between the plug and the seat, substantially as described.

EDWARD M. DART.

Witnesses:
SOCRATES SCHOLFIELD,
JOHN S. LYNCH.